US010334122B2

(12) United States Patent
Chen (10) Patent No.: US 10,334,122 B2
(45) Date of Patent: Jun. 25, 2019

(54) DYNAMIC MEDIA ITEM LAYOUT PRESENTATION (71) Applicant: Apple Inc., Cupertino, CA (US)

(72) Inventor: Wen-Chieh Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 15/366,414

(22) Filed: Dec. 1, 2016

(65) Prior Publication Data
US 2017/0358107 A1 Dec. 14, 2017

Related U.S. Application Data (60) Provisional application No. 62/349,350, filed on Jun. 13, 2016.

(51) Int. Cl.
G06K 9/34 (2006.01)
H04N 1/00 (2006.01)
G06T 11/60 (2006.01)

(52) U.S. Cl.
CPC ......... *H04N 1/00196* (2013.01); *G06T 11/60* (2013.01)

(58) Field of Classification Search
CPC ... G06T 7/97; G06T 7/11; G06T 2207/20132; G06K 9/2054
See application file for complete search history.

(56) References Cited

U.S. PATENT DOCUMENTS

| 6,901,378 | B1* | 5/2005 | Linker | G06F 17/30265 705/26.41 |
|---|---|---|---|---|
| 7,797,377 | B2* | 9/2010 | Linker | G06F 17/30265 705/26.8 |
| 7,917,859 | B1* | 3/2011 | Singh | G06F 9/451 715/763 |
| 8,046,717 | B1* | 10/2011 | Goel | G06Q 10/00 715/810 |
| 8,144,995 | B2* | 3/2012 | Thompson | G06F 17/30256 382/176 |
| 8,200,039 | B2* | 6/2012 | Jin | G06T 7/30 382/276 |
| 2004/0160462 | A1 | 8/2004 | Sheasby et al. | |
| 2005/0044485 | A1 | 2/2005 | Mondry et al. | |
| 2007/0182738 | A1* | 8/2007 | Feldman | G06T 15/20 345/427 |
| 2008/0205789 | A1* | 8/2008 | Ten Kate | G06F 17/30265 382/284 |
| 2011/0074824 | A1* | 3/2011 | Srinivasan, Sr. | G06F 3/04883 345/660 |
| 2012/0054649 | A1* | 3/2012 | McDonald | G06F 3/048 715/764 |

(Continued)

*Primary Examiner* — Samir A Ahmed
(74) *Attorney, Agent, or Firm* — Invoke (57) ABSTRACT

A method may include generating a list of frame candidates, the list of frame candidates including a plurality of aspect ratios, based on a characteristic of a display device and an aspect ratio of a base tile; receiving a set of media items, each with a respective aspect ratio (AR), to display on the display device; and for each respective media item in the set of media items: filtering the list of frame candidates based on a respective aspect ratio of the list of frame candidates being within a threshold cropping amount of the AR of the respective media item; and matching the respective media to a frame candidate of the filtered list of frame candidates.

20 Claims, 8 Drawing Sheets (56) References Cited

U.S. PATENT DOCUMENTS

| | | | | |
|---|---|---|---|---|
| 2013/0051671 A1* | 2/2013 | Barton | .................. | G06T 7/12 |
| | | | | 382/173 |
| 2014/0188843 A1* | 7/2014 | Smiling | .............. | G06F 17/3005 |
| | | | | 707/722 |
| 2014/0189502 A1* | 7/2014 | Enns | .................. | G06T 3/4038 |
| | | | | 715/247 |

\* cited by examiner

DYNAMIC MEDIA ITEM LAYOUT PRESENTATION

CLAIM OF PRIORITY

This application is a Non-Provisional of and claims the benefit of priority to U.S. Provisional Application Ser. No. 62/349,350, entitled "DYNAMIC MEDIA ITEM LAYOUT PRESENTATION," filed on Jun. 13, 2016 which is hereby incorporated by reference herein in its entirety.

TECHNICAL FIELD

Embodiments described herein generally relate to media viewing and in particular, but without limitation, to a dynamic media item layout presentation.

BACKGROUND

Media viewing applications allow a user to view one or more media items (e.g., videos, photos) on a display device. For example, a media viewing application may display photos taken by a user on a mobile device.

A user's collection of media items—such as photos and videos—often do not all share the same aspect ratio. For example, a photograph taken in panoramic mode may have a 10:1 ratio whereas the default landscape ratio may be 4:3 (with portrait being 3:4). A media viewer application may make a number of decisions when generating a layout of thumbnails (also referred to as previews) of a collection, each with their own drawbacks.

One approach is to split up a display into a grid of a tiles, each the same height and width. Within each tile, a choice may be made to either fill the tile, thereby cropping a significant portion of media item that do not match the height/width, or scaling the media item, leaving empty space in the tile. Additionally, if cropping is used, a user is not able to tell what the underlying aspect ratio is. Thus, if a user is looking for a specific panoramic picture, the user may be forced to click each preview to find it.

Another approach may be to use a fixed layout of varying tile sizes and aspect ratios. However, certain items in the collection may not match the available sizes in the layout and similar cropping/scaling issues may present themselves. A variant of this idea may permit an out-or-order placement of media items to try and match available tiles. However, this is often undesirable to a user who is trying to find a particular picture based on time. Yet another variant, may maintain the order and look for the next matching tile, but this may leave unfilled tiles.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 6-7 illustrate flowcharts for placing media items in frame candidates, according to various examples; and in which

DETAILED DESCRIPTION

Various examples are described herein for displaying a collection of media items in a layout while maintaining an order of media items and minimizing cropping. A person of ordinary skill in the art may recognize other benefits as well.

Figure 1:
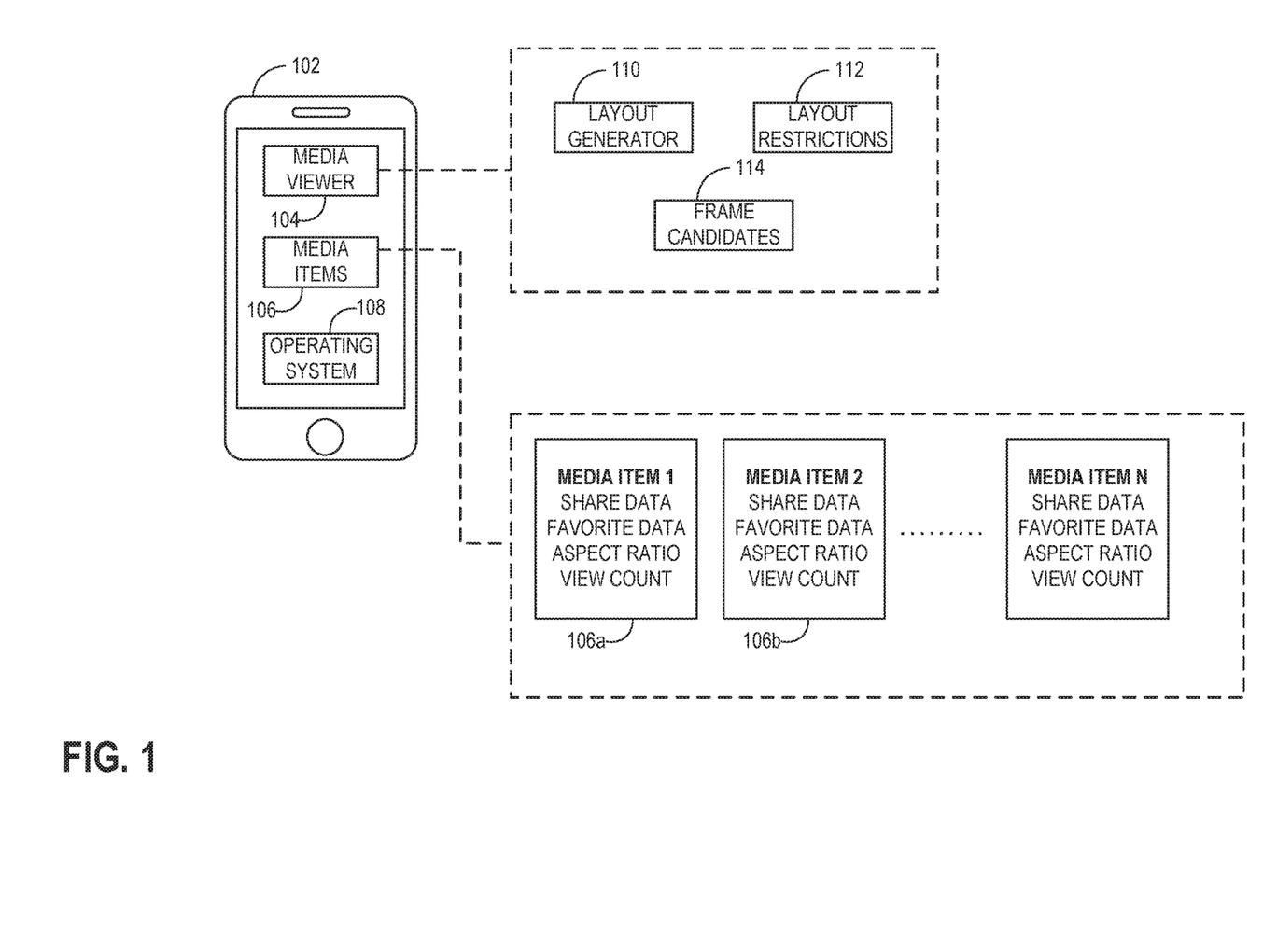
FIG. 1 illustrates a schematic diagram of components of a computing device, according to various examples.

FIG. 1 illustrates a schematic diagram of components of a computing device 102 that includes media viewer application 104, media items 106, and operating system 108. The computing device 102 may include additional components that are not illustrated, such as at least one transmitter, storage device, microphone, processing unit (e.g., a general purpose processor or application specific integrated circuit), display device, touch sensor, input device, and image sensor that facilitate the operations described in this disclosure. Although computing device 102 is illustrated as a mobile phone, other configurations (e.g., tablet, laptop, desktop computer) may be employed without departing from the scope of this disclosure. The computing device 102 does not require all of these components in all examples.

In various examples, the location of execution of media viewer application 104 and the display device are separate. Video data may be streamed from computing device 102 to an external display device. In some embodiments, computing device 102 controls the display of media items on the external device, but the media items may be received from yet another device. For example, a separate computing device may receive the media items from an internet-based service for display on the external display device.

In various examples, the media viewer application 104 is a software component executable by a processing unit of the computing device 102. The media viewer application 104 may be embodied as a set of instructions stored on a storage device of computing device 102. Executing the media viewer application 104 may include loading some of all of the instructions into random-access memory of the computing device 102 for execution by the processing unit. Executing may also include loading and storing program variables into memory registers of the processing unit. During execution of the instructions, the processing unit may be considered to be configured to perform the operations described herein. A similar process may be employed for other components discussed in this disclosure. A processing unit may be simultaneously configured to execute multiple executions through the loading and storing of instructions.

The media viewer application 104 may be a stand-alone application. For example, an icon representing the application may be presented on the display device of computing device 102 that may be activated (clicked/touched) to launch the media viewer application 104. A user interface may be presented for the media viewer application 104 that displays one or more media items as discussed in further detail below.

Alternatively (or additionally), the media viewer application 104 may be incorporated into another application or called via an application programming interface (API). For example, a photo editing application may use (either incorporate or call) the layout features described herein to present a collection of photos.

The media items 106 in FIG. 1 represent media items stored on a storage device. The storage device may be part of computing device 102 or an external storage source. The media items 106 may include the binary data of the media file as well as metadata associated with the media file.

Metadata may include fields describing the media items such as date taken, horizontal resolution, vertical resolution, location taken, etc. (collectively referred to as descriptive metadata). In the case of image files, the descriptive metadata may be stored as part of the image data itself as exchangeable image file format (Exif) data. The Exif data may be delineated by a byte marker in the image file. However, the descriptive metadata is not required to be part of the file and may be stored as a separate file or as entry in a database, in various examples. In some instances, a thumbnail of the image data is stored as part of the descriptive metadata. As illustrated in FIG. 1, the aspect ratio of media item 106a may be considered descriptive metadata.

Usage metadata may include data concerning how the media item has been used post-capture. Usage metadata may include, as illustrated in media item 106a, share data, favorite data, and view count. Share data may include the number of times the media item has been shared (e.g., sent in a messaging application, e-mailed, etc.)

The share data may be tracked by operating system 108 or as part of media viewer application 104. The view count may indicate how many times a user has viewed a version (e.g., a full sized version) of a media item. Favorite data may indicate a rating (e.g., one to five stars) for the media item as set by a user. A user may associate a rating to a media item using media viewer application 104, in an example.

The usage metadata may be stored as part of the media file, as a separate file, or as a database entry in a similar fashion to the descriptive metadata. Additionally, although specific elements (e.g., resolution, favorite data) have been described as either descriptive metadata or usage metadata, parts of usage metadata may be considered descriptive metadata and vice versa.

A third type of metadata, weighting metadata, may be based on a weighting algorithm that uses other types of metadata, such as the usage metadata and descriptive metadata. The weighting metadata may indicate the relative importance to a user of a media items compared to other media items. For example, a relatively straightforward weighting algorithm may sum all or a subset of the usage metadata such as the share count and view count and multiply the result by the favorite data. The weighting may be standardized to a scale (e.g., one, two, or three). More sophisticated algorithms may also be used without departing from the scope of this disclosure. As with the other types of metadata, the weighting metadata may be stored in a number of locations.

The media viewer application 104 may include a number of components such as the layout generator 110, the layout restrictions 112, and the frame candidates 114. The layout generator 110 may generate the frame candidates 114 based on the layout restrictions 112 as explored in more detail with reference to FIG. 2 and FIG. 3.

Figure 2:
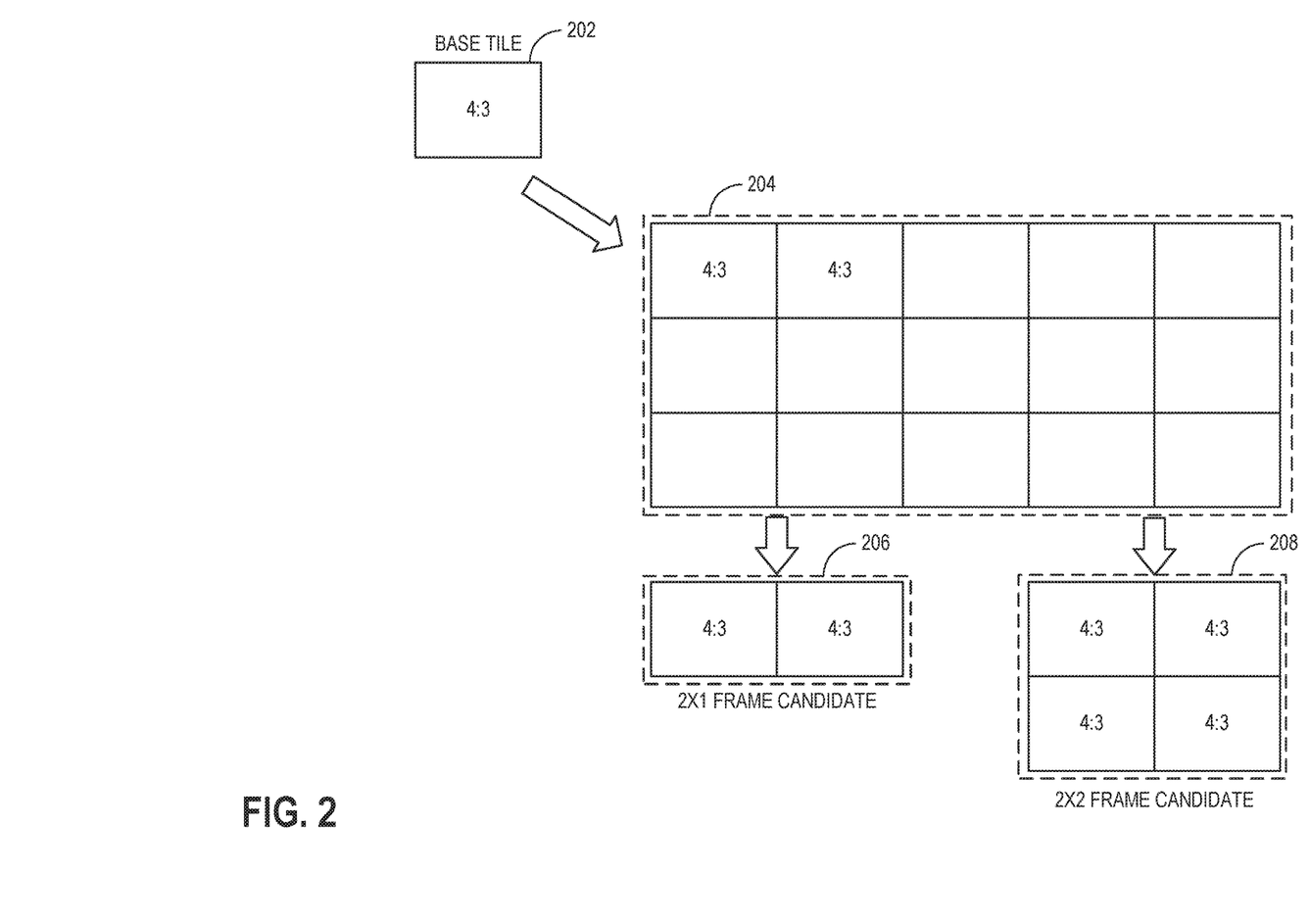
FIG. 2 illustrates a layout grid, according to various examples.

FIG. 2 illustrates a layout grid, according to various examples. The layout grid 204 is comprised of a series of base tiles 202. When a user (or application program) requests to display a set of media items, the layout generator 110 may access layout restrictions 112 to determine what size and aspect ratio to make base tile 202. For example, the layout restrictions 112 may include profiles for a number of different display sizes. In some instances, a display size may be set in points, rather than pixels; however other units of measurement may be used without departing from the scope of this disclosure.

A profile may be queried using the horizontal size and vertical size of the display, which may flip if the display device is rotated. For a given horizontal/vertical display size, the profile may identify a base tile size (e.g., width and height in points or other selected measurement unit), a base tile aspect ratio, a number of columns for a layout, the minimum/maximum width of a frame candidate (e.g., as a multiple of base tile 202), the minimum/maximum height of a frame candidate (e.g., as a multiple of base tile 202), and a maximum number of base tiles for a given frame candidate.

Accordingly, after receiving the profile corresponding to a display device, a grid such as layout grid 204 may be generated. Generation may not mean displaying the grid at this stage, but rather, an internal representation of the grid may be generated pursuant to the layout restrictions 112 for the display device. Similarly, as discussed later, matching may not mean displaying. Instead, the match (e.g., an identifier of a frame candidate and an identifier of a media item) may be used when the layout process is completed. As will be seen, matches may change before a final layout is determined.

Thus, in FIG. 2 the base tile 202 has a ratio of 4:3 and there are five columns of base tiles. Further illustrated are exemplary frame candidate 206 and frame candidate 208. The frame candidate 206 is a 2×1 frame candidate made up of a two base tiles side-by-side, and the frame candidate 208 is a 2×2 frame candidate made up of four base tiles.

Figure 3:
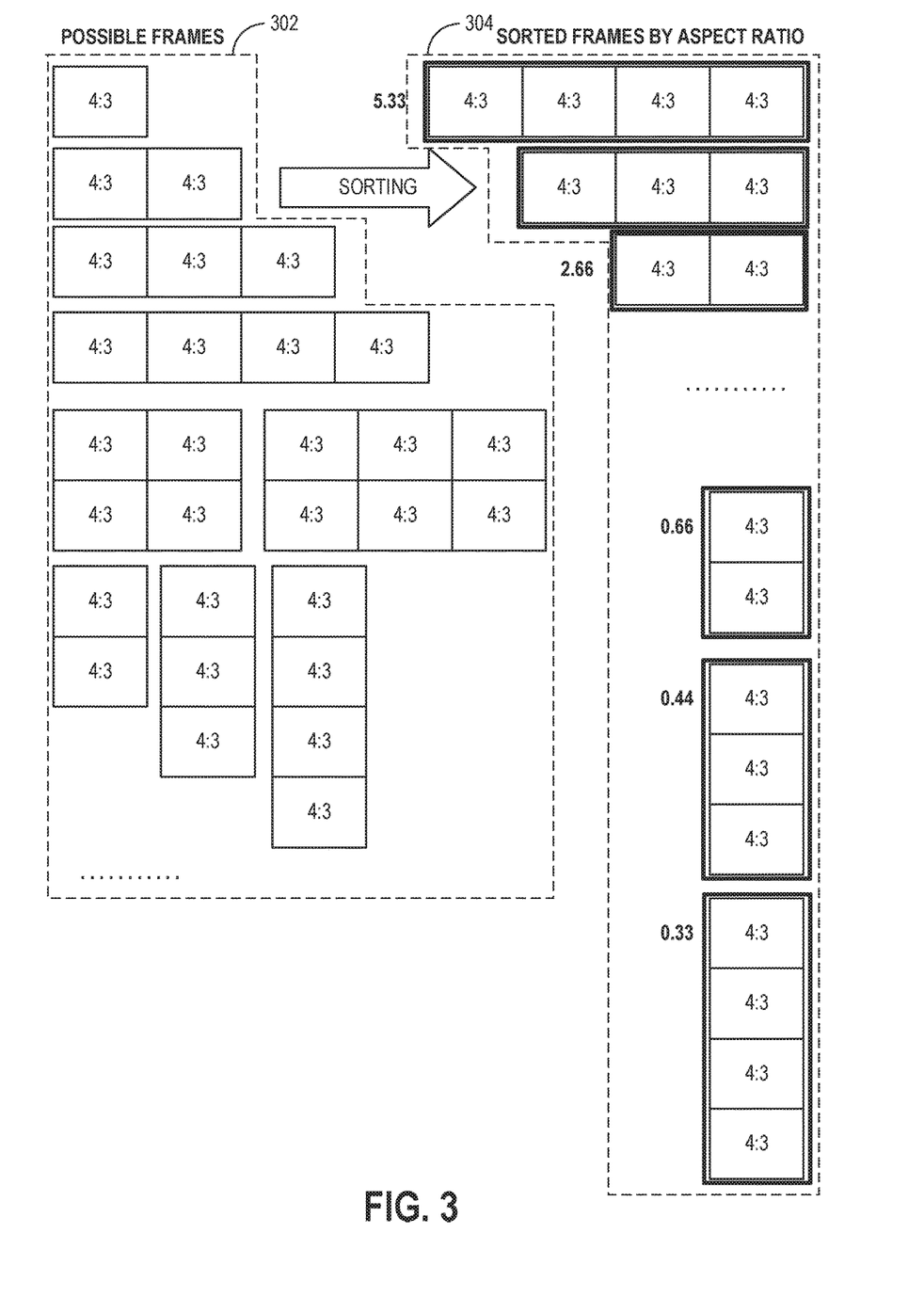
FIG. 3 is a visual representation of generating a list of frame candidates, according to various examples.

FIG. 3 is a visual representation of generating a list of frame candidates, according to various examples. FIG. 3 illustrates unsorted frame candidates 302 and sorted frame candidates 304. The unsorted frame candidates 302 may be the result of the layout generator 110 iterating through all possible combinations of frame candidates given the layout restrictions 112. For example, pseudo-code for iterating through the combinations may be:

for (i=0; i<=max width; i++)
  for (x=1; x<=max height; x++)
    if (i*x<=max size)
      add (i by x) to list of frame candidates The above pseudo-code is merely an illustration and other algorithms may be used.

Once all the possible frame candidates have been generated, the list may be sorted. With reference back to FIG. 3, it is seen that a number of frame candidates were generated in the unsorted frame candidates 302 such as a 1×1 frame, a 2×2 frame, a 4×1 frame, and a 1×4 frame, among others. The layout generator 110 may take the list and sort it according to its overall aspect ratio. Thus, a 4×1 frame candidate of a 4:3 base tile has a 16:3 aspect ratio and becomes 5.34. The sorted frame candidates 304 are sorted largest to smallest (with aspect ratios listed next to them), but the reverse may also be used.

A basic match of a media item to a frame candidate begins by accessing metadata of a media item to determine its aspect ratio. The aspect ratio of the media item may be compared to the list of candidate aspect ratios in the sorted frame candidates 304 to determine frame candidates within an acceptable cropping range of the aspect ratio of the media item.

The layout restrictions 112 may indicate a cropping threshold permitted for each media item. In some instances, a base cropping threshold (e.g., less than 25%) is used for most media times, but certain media items have a different cropping threshold (e.g., a panoramic photo may be cropped more than a 4:3 aspect ratio photo). A cropping percentage may be calculated by looking at the percentage of a media item that would be cropped after scaling the media item to fill the entire frame candidate. Thus, both 8:3 and 4:6 aspect ratio media items would have a 50% cropping percentage for a 4:3 frame candidate.

Based on the cropping threshold, one or more frame candidates in the sorted frame candidates 304 may be determined as an acceptable match. By using a sorted list, a processor may more quickly search and find frame candidates surrounding the aspect ratio within the cropping threshold—rather than iterating through all the frame candidates in an unsorted list. On a less capable processing device, this may be the difference between smooth scrolling of media items and stuttering performance.

Figure 4:
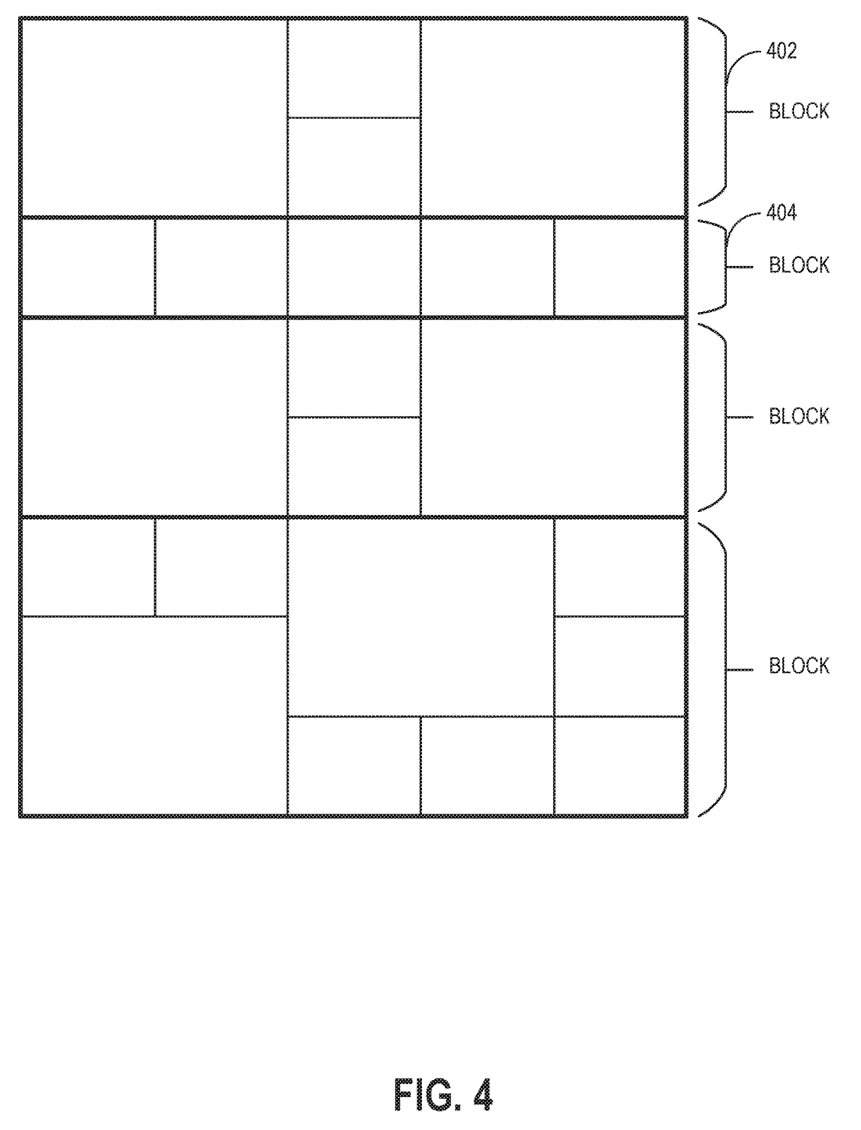
FIG. 4 illustrates a block layout, according to various embodiments.

FIG. 4 illustrates a block layout, according to various embodiments. In order to create a more visually pleasing appearance, a layout may be separated into one more blocks of base tiles. A block may be defined as a number of rows of base tiles. Thus, block 402 is a two-row block and block 404 is a one-row block. A minimum and/or maximum number of rows per block may be set in layout restrictions 112. The layout generator 110 may use blocks in determining the placement of media items in various examples.

Figure 5:
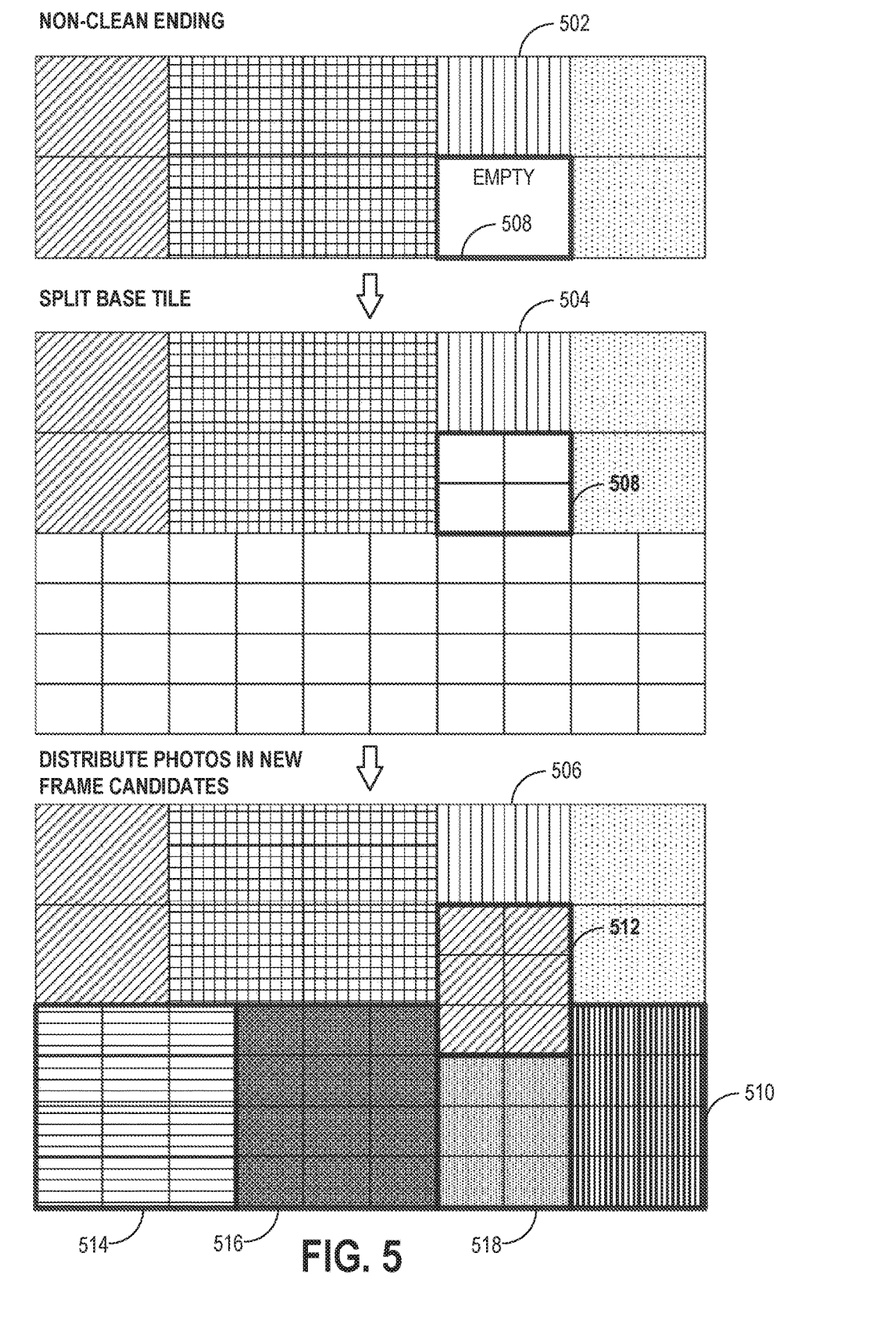
FIG. 5 illustrates a process of generating additional frame candidates, according to various examples.

As discussed in more detail with respect to FIG. 5 it may become necessary to split a base tile to generate more frame candidates to fit all the media items into frames while minimizing cropping. When blocks are used, the process of splitting tiles may occur at the end of a block. In the absence of blocks, the split-tile process may be employed a single time (e.g., at the end of the display of a collection of media items).

FIG. 5 illustrates a process of generating additional frame candidates, according to various examples. As previously discussed, one goal of the layout process is to create a clean ending on each row. However, because of the cropping constraints, there may not always be a frame candidate that is close enough to an aspect ratio of a media item to match. For example, the unfilled layout 502 shows that frame candidate 508 does not have a matched media item.

When not all tiles are filled in a row, a base tile may be split and the process of matching may be repeated for a certain number of media items (e.g., the last ten media items). The number may be set in layout restrictions 112. The split layout 504 shows an example of splitting a base tile horizontally and vertically, thereby creating four tiles for each base tile. For example, frame candidate 508 as shown in unfilled layout 502 is made up of a single base tile. In split layout 504, the same frame candidate 508 has now been split into four tiles. Although the number of tiles has increased, the layout restrictions 112 may indicate that a media item may not be matched to a width or height less than the original base tile, thereby not permitting relatively small thumbnail images.

As with the initial layout process, a list of frame candidates may be generated using the unsplit and split base tiles and sorted by aspect ratio. In some examples, the process of generating these additional frame candidates is completed at the same time the initial list is created, but the frame candidates based on the split tiles are not allowed until needed (e.g., until a match cannot be made). The filled split layout 506 illustrates that after the base tile has been split the rest of the layout has been successfully filled in with no gaps.

As can be seen, four of the five frame candidates (frame candidates 512, 514, 516, and 518) in filled split layout 506 are based on the split tiles. For example, frame candidate 512 is the size of 1.5 base tiles. On the other hand, frame candidate 510 is based on two base tiles and does not use one of the newly available aspect ratios.

Figure 6:
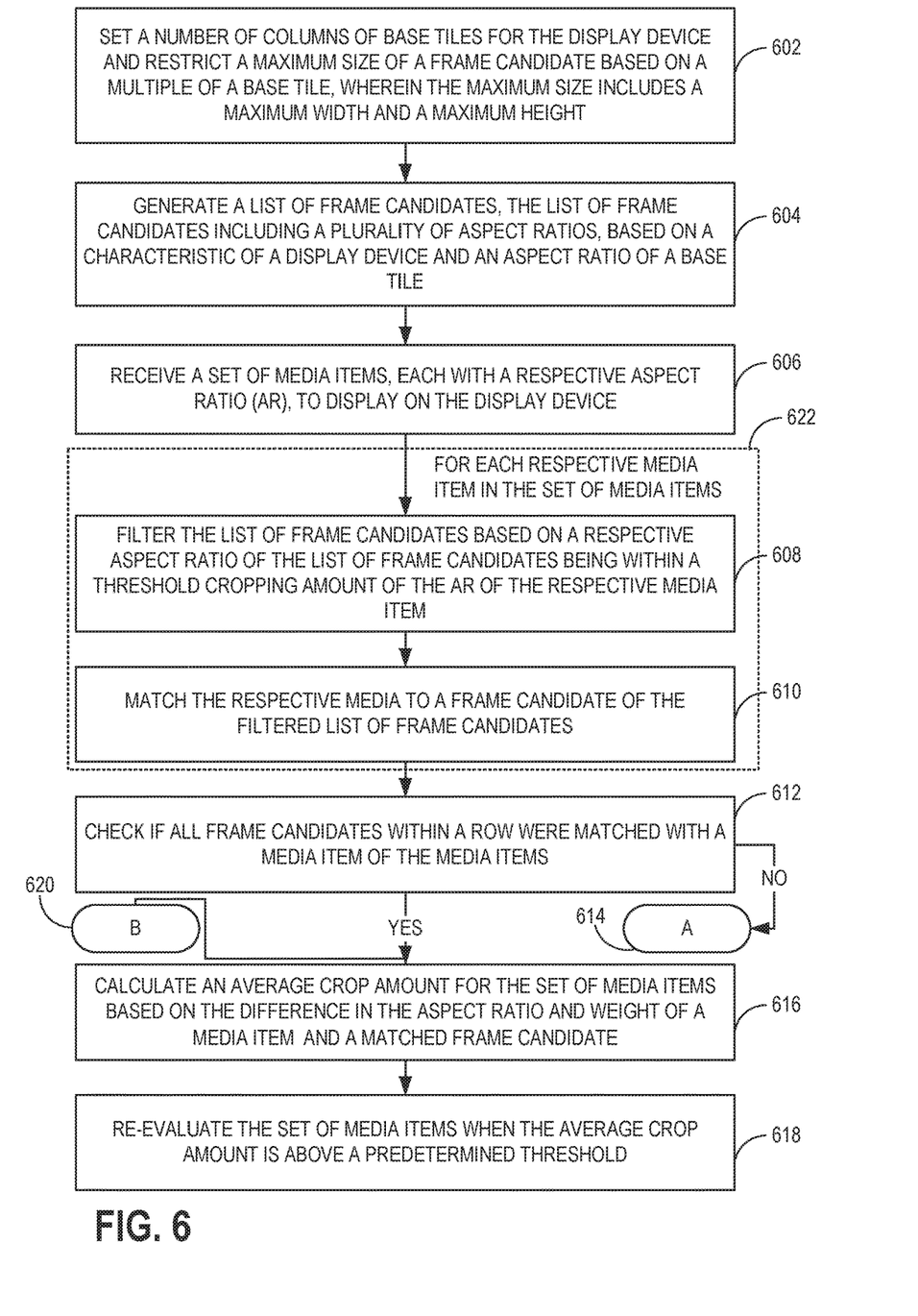
Figure 7:
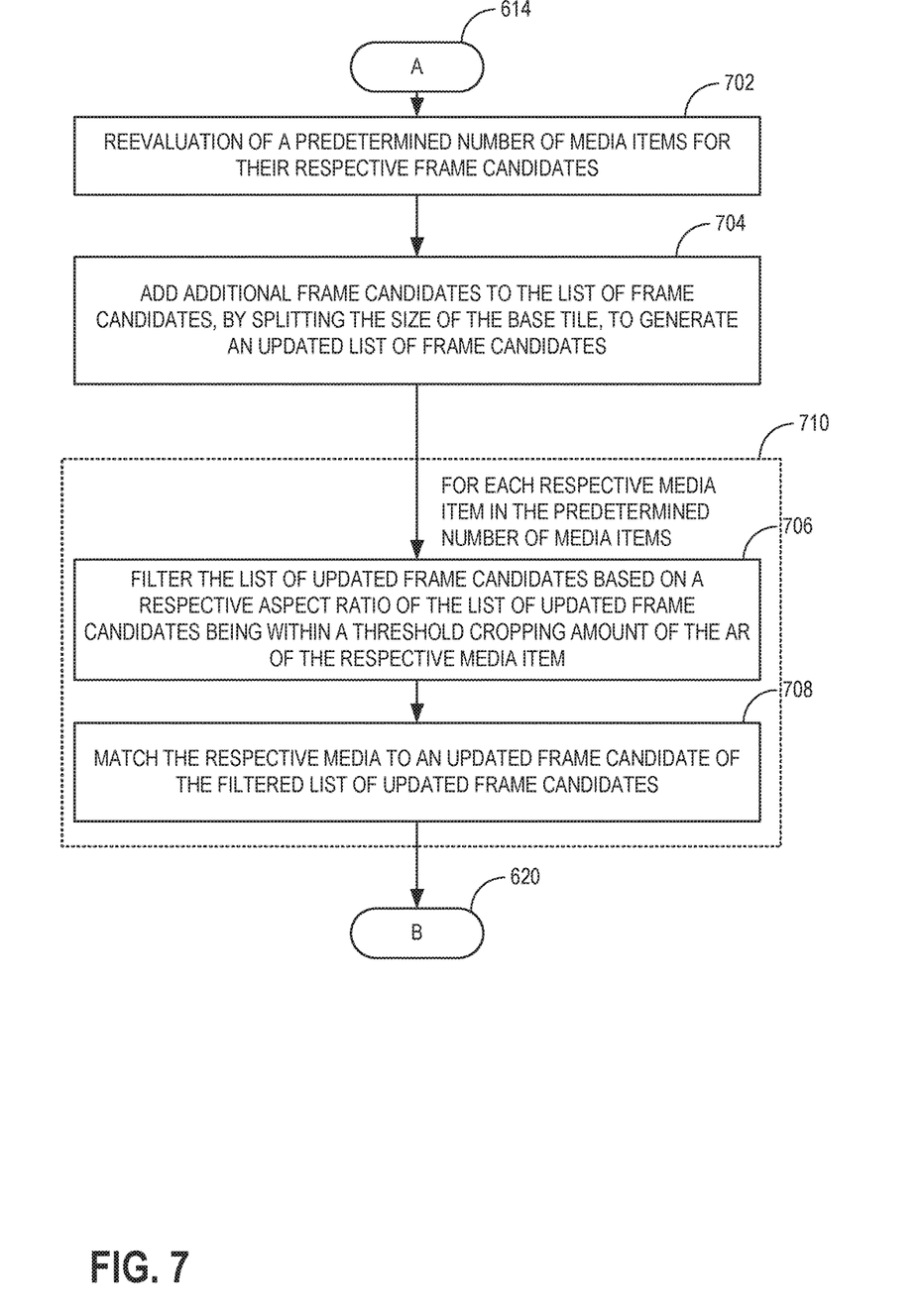

FIGS. 6-7 illustrate flowcharts for placing media items in frame candidates, according to various examples. For discussion purposes, the operations in FIGS. 6-7 are described as being performed by a media viewing application. However, the operations may be performed across a number of applications, as part of an operating system library, or as a component of a different application without departing from the scope of this disclosure. Not all examples require performance of each of the operations described in FIGS. 6-7.

At operation 602, the media viewing application sets a number of columns of base tiles for a display device and restricts a maximum size of a frame candidate based on a multiple of a base tile. The maximum size may include a maximum width and maximum height. The display device may be part of the same computing device the media viewing application is executing on or an external display.

To determine the restrictions and size of a base tile, the media viewing application may use a profile of the display to obtain the width of the display device and use the width as an input into a database of layout restrictions. In some examples, a user may scroll through media items in a vertical manner. However, in other examples, a user may scroll through media items horizontally. In such instances, instead of setting the number of columns, a static number of rows may be used.

At operation 604, the media viewing application may generate a list of frame candidates. The list of frame candidates may include a plurality of aspect ratios based on a characteristic (e.g. width) of the display device and the aspect ratio of the base tile. The frame candidates may be determined by iterating through possible frame candidate combinations while adhering to the layout restrictions. The list of frame candidates may then be sorted according to the overall aspect ratio of the frame candidate.

In some examples, an updated list of frame candidates may be determined that splits the base tile into multiple tiles. The size of the split may be based on the layout restrictions. A default split may split the base tile into four equally sized tiles that each maintain the aspect ratio of the base tile.

At operation 606, in an example, the media viewing application receives a set of media items. Each media item has its own aspect ratio (although many media items may share the same aspect ratio). The media viewing application may receive the media items by accessing them from a storage device. In some example, receiving includes receiving the metadata that includes the aspect ratio, but not the binary media item itself.

The set of media items may be determined by what a user wants to view. For example, a user may select an album of photos taken on a particular day. In another examples, the user may view all photos ever taken on a particular device. Identifiers (e.g., file name) of the media items in the user determined set may be received as part of the set of media items.

The operations of 608 and 610 may be repeated for each media item in the set of media items (signified by box 622). The order of the set of the media items may be maintained while performing operations 608 and 610. Order may be defined in a number of ways such as the date order or the order of photos in an album, which may not adhere to the order that the photos were taken.

At operation 608, the list of frame candidates is filtered based on a respective aspect ratio of the list of frame candidates being within a threshold cropping amount of the aspect ratio of the respective media item. In other words, the remaining frame candidates are those frame candidates that are under or at cropping threshold if the media item was scaled to fit within the frame candidate while maintaining the original aspect ratio of the media item (e.g., to avoid distorting the media item).

At operation 610, the media item is matched to one filtered list of frame candidates. Matching may include a number of decisions. The media viewing application may first select the filtered frame candidate that is closest to the aspect ratio of the media item (in the case of a tie, either may be chosen). Next, the media viewing application checks to see if there is room left on the current row for the chosen frame candidate. In various examples, the media viewing application fills rows left to right and top to bottom.

Thus, consider the situation in which a first media item has a 4:3 aspect ratio and there are five columns of base tiles, also with 4:3 aspect ratio. If the first four columns already have media items matched, the media item may be placed in the last column. However, if no other media items have been matched, the media viewing application may have choices beyond just the first 4:3 frame candidate in the first column.

For example, a 2×2 frame candidate of 4:3 aspect ratios still has as overall aspect ratio of 4:3. So does a 3×3 frame candidate and so on. Accordingly, there may be multiple frame candidates to choose from. In some examples, media items, in addition to having cropping preferences, have size preferences. Thus, some media item may be able to use four base tiles, whereas other media items may only be able to use one base tile depending on remaining space in a given row.

The number of base tiles to use for a given media item may be based on retrieving weighting metadata for the respective media item. Different weights may correspond to different permitted multiples of base tiles. In another example, a permitted size may be determined as a multiple of the smallest frame candidate with a certain aspect ratio. Thus, assuming there are weights of one, two, or three (as an example) a one weight may not be able to fill a frame candidate larger than a 1×1 base tile, whereas as a two weight may be permitted to fill up to a 2×2 frame candidate, etc.

In an example, the media viewing application may match the media item to the largest size frame candidate that matches a desired aspect ratio. Thus, the priority may be to choose a bigger sized frame candidate at the expense of an increase in cropping. The priority may also be reversed such that a closer aspect ratio is preferred over a larger frame candidate.

The layout and matched media items may be stored as a data structure for use when actually displaying the media items. For example, the data structure may be a list of tuples [size of frame, location/identifier of the media item]. When presenting the media items, the data structure may be iterated through to accurately display the media items. The precise data structure is exemplary in nature and other data structures may be used without departing from the scope of this disclosure.

At operation 612, the media viewing application may check to see if all base tiles in a row were matched with a media item. In some instances, one or more base tiles may be unmatched for a row (see unfilled layout 502 in FIG. 5 as an example). In such cases, the media viewing application may perform a variety of operations to ensure the row is filled.

One operation may be to reevaluate matched frame candidates in the row. For example, if a first media item matched to a 2×2 frame candidate, the media item may be instead matched to a 1×1 frame candidate thus freeing up space within a given row to ensure all tiles are matched. In another example, a media item may be matched to a frame candidate that crops more than the initially matched frame candidate. In various examples, the new frame candidate should still be from the list of filtered frame candidates for that media item to ensure not too much of the media item is cropped.

If the row still cannot be filled (operation 614), flow may continue to operation 702, illustrated in FIG. 7, where the media viewing application may reevaluate a predetermined number of media items (e.g., ten) for their respective frame candidates. The predetermined number may be set as a variable within the media viewing application. In some examples, the number may be changed using an input element of the media viewing application.

At operation 704, the media viewing application may add additional frame candidates to the list of frame candidates by splitting the size of the base tile thereby generating an updated list of frame candidates. As discussed above, the additional frame candidates may already have been generated, but at this point they may become available for matching to a media item.

In various examples, operations 706 and 708 are conducted for each respective media item in the predetermined number of media items (signified by box 710). At operation 706, the media viewing application may filter the list of updated frame candidates based on a respective aspect ratio of the updated frame candidates being within a threshold cropping amount of the aspect ratio of the respective media item. This process may be similar to operation 608.

At operation 708, the media viewing application may match the respective media item to an updated frame candidate of the filtered list of updated frame candidates. Operation 708 may be performed in a similar manner as operation 610. If a row still cannot be filled, the media viewing application may increase the number of predetermined media items.

In some examples, the processing of splitting the base tile is repeated when the last media item of the set of media items is matched, which may result in blank base tiles after the last match. In some examples, splitting the base tile and reevaluating may be repeated at the end of each block (e.g., the end of three rows).

With reference back to FIG. 6, operations 616 and 618 may be performed after a layout has been generated that does not leave any blank tiles in a row. At operation 616, the average cropping amount may be calculated for the layout based on averaging the difference between each matched media item and its matched frame candidate. If the average is below a certain threshold (e.g., 20%), the process may end and the layout may be presented with the media items in their matched frame candidates.

Additionally, an overall score for a layout may take into consideration the weight of a media item with the matched framed candidate. If a media item was matched to a smaller frame candidate than the maximum for a given weight—say if a photo weight indicated a preferred match of a 3×3 frame but only matched to a 1×2—the score may be lower. The overcall score may be a blend of the average crop and the average closeness for according to weight. If the overall score is below a threshold, new layouts may be generated.

At operation 618, if the average is above the threshold, the media viewing application may reevaluate the set of media items. For example, the process of operations through 620 may be repeated with changing at least one match (e.g., selecting a different frame candidate). The reevaluation process may be repeated a predetermined number of times to generate additional layouts. The layout with the lowest average crop may be used to display the media items.

In an embodiment, the layout process may be in the middle of a set of media items. For example, consider a library of 10,000 photos. Rather than generate a layout that fits all 10,000 photos, the media viewing application may layout 300 (or some other defined number) photos based on where a user is navigating and viewing within the 10,000. Thus, if a user scrolls to the middle of the set, the media viewing application may layout the 150 photos above the middle and layout 150 photos below (assuming a vertical scroll). By only laying out a subset of a collection, smoother graphic performance may be achieved.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
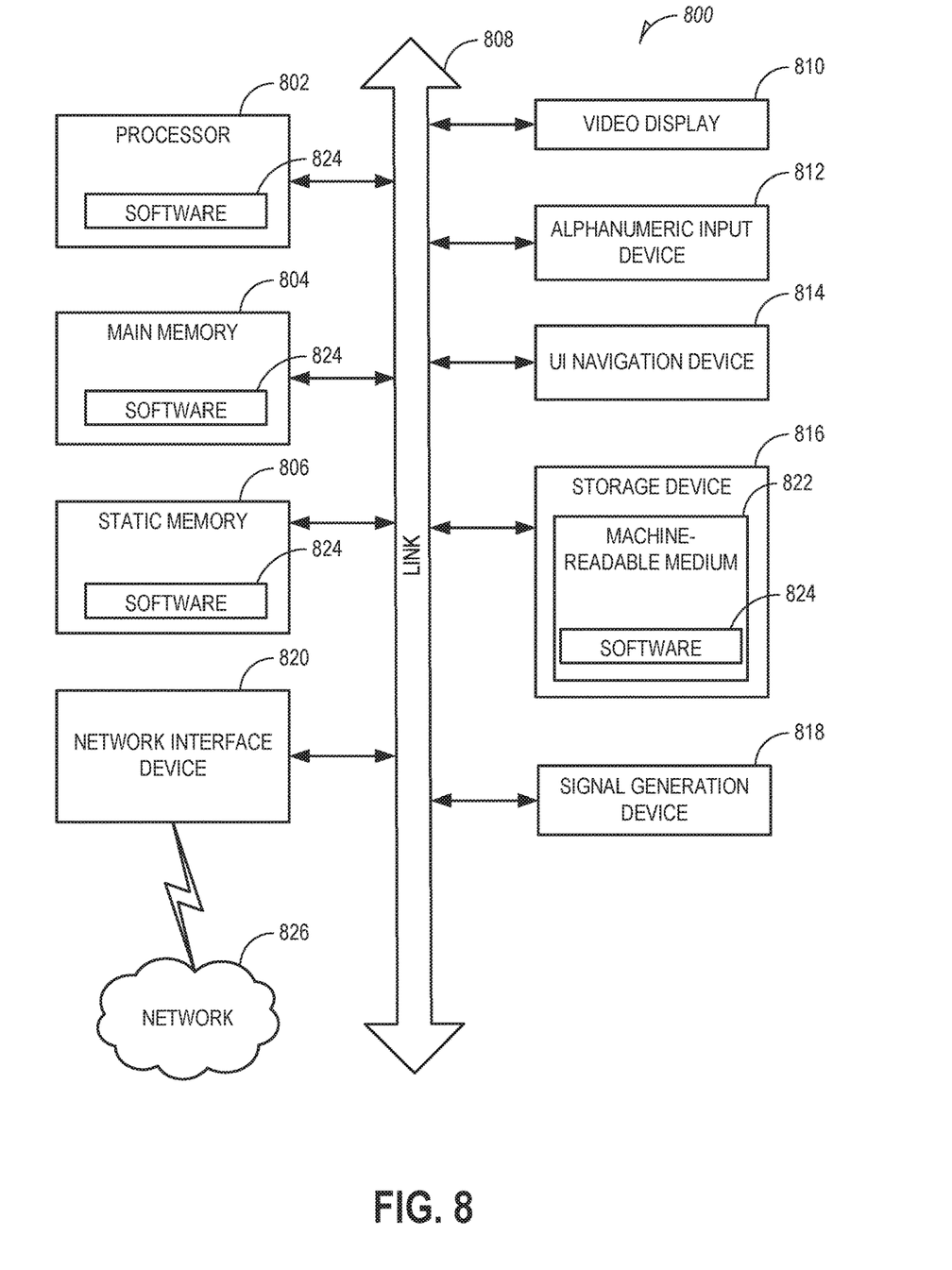
FIG. 8 is a block diagram illustrating an example machine upon which any one or more of the techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 4G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method implemented in a display device having one or more processors, the method comprising:
   generating, by the one or more processors, a list of frame candidates, the list of frame candidates including a plurality of different aspect ratios selected based on a width of the display device and an aspect ratio of one or more base tiles available to display media items on the display device;
   receiving, by the one or more processors, a set of media items to display on the display device, each media item having a respective aspect ratio (AR);
   for each respective media item in the set of media items:
      filtering, by the one or more processors, the list of frame candidates to produce a filtered list of frame candidates by removing undesirable frames from the list of frame candidates in response to a determination that a respective aspect ratio of the undesirable frames in the list of frame candidates requires greater than a threshold cropping amount of the AR of the respective media item; and
      matching, by the one or more processors, the respective media item to a particular frame candidate of the filtered list of frame candidates to produce a selected frame; and
   displaying, on the display device, the set of media items in the selected frames.

2. The method of claim 1, wherein generating the list of frame candidates comprises:
   setting a number of columns of the one or more base tiles for the display device; and
   restricting a maximum size of each frame candidate in the list of frame candidates based on a multiple of the number of columns of the one or more base tiles, wherein the maximum size includes a maximum width and a maximum height.

3. The method of claim 1, further comprising:
   after each respective media item has been matched with a particular frame candidate, checking whether every frame candidate within a particular row has been matched with a respective media item of the set of media items.

4. The method of claim 3, further comprising, when it is determined that not all frame candidates within a row were matched:
   reevaluating a predetermined number of media items for their respective frame candidates;
   adding additional frame candidates to the list of frame candidate, by splitting the size of the base tile, to generate an updated list of frame candidates; and
   for each respective media item in the predetermined number of media items;
      filtering the list of updated frame candidates based on a respective aspect ratio of the list of updated frame candidates being within a threshold cropping amount of the AR of the respective media item; and
      matching the respective media to an updated frame candidate of the filtered list of updated frame candidates.

5. The method of claim 4, wherein matching the respective media to an updated frame candidate of the filtered list of updated frame candidates includes changing at least of the predetermined number of media items to match a different frame candidate.

6. The method of claim 1, wherein matching the respective media item to the particular frame candidate of the filtered list of frame candidates includes determining a number of the one or more base tiles to use to display the respective media item.

7. The method of claim 6, wherein determining the number of the one or more base tiles to use to display the respective media item includes retrieving weighting metadata for the respective media item.

8. The method of claim 7, wherein the weighing metadata includes a number of times the respective media item has been viewed.

9. The method of claim 1, further comprising setting a target number of rows to display the set of media items prior to generating the list of frame candidates.

10. The method of claim 1, further comprising:
    determining, for each respective media item in the set of media items, a difference between the AR of the respective media item and an aspect ratio of the particular frame candidate matched to the respective media item; and
    calculating an average crop amount for the set of media items based on the differences between each AR of respective media items in the set of media items and aspect ratios of the particular frame candidates matched to the respective media items.

11. The method of claim 10, further comprising:
reevaluating the set of media items in response to a determination that the average crop amount is above a predetermined threshold.

12. The method of claim 11, wherein the reevaluating includes choosing at least one different frame candidate from the filtered list of frame candidates for a previously matched media item.

13. A non-transitory computer-readable medium comprising instructions, which when executed by at least one processor, cause the at least one processor to perform operations on a display device, the operations comprising:
generating a list of frame candidates, the list of frame candidates including a plurality of different aspect ratios selected based on a width of the display device and an aspect ratio of one or more base tiles available to display media items on the display device;
receiving a set of media items to display on the display device, each media item having a respective aspect ratio (AR);
for each respective media item in the set of media items:
filtering the list of frame candidates to produce a filtered list of frame candidates by removing undesirable frames from the list of frame candidates in response to a determination that a respective aspect ratio of the undesirable frames in the list of frame candidates requires greater than a threshold cropping amount of the AR of the respective media item; and
matching the respective media item to a particular frame candidate of the filtered list of frame candidates to produce a selected frame; and
displaying, on the display device, the set of media items in the selected frames.

14. The non-transitory computer-readable medium of claim 13, wherein generating the list of frame candidates comprises:
setting a number of columns of the one or more base tiles for the display device; and
restricting a maximum size of each frame candidate in the list of frame candidates based on a multiple of the number of columns of the one or more base tiles, wherein the maximum size includes a maximum width and a maximum height.

15. The non-transitory computer-readable medium of claim 13, wherein the instructions, which when executed by the at least one processor, further cause the at least one processor to perform an operation comprising:
after each respective media item has been matched with a particular frame candidate, checking whether every frame candidate within a particular row has been matched with a respective media item of the set of media items.

16. The non-transitory computer-readable medium of claim 15, wherein the instructions, which when executed by the at least one processor, further configure the at least one processor to perform operations, when it is determined that not all frame candidates within a row were matched, comprising:
reevaluating a predetermined number of media items for their respective frame candidates;
adding additional frame candidates to the list of frame candidate, by splitting the size of the base tile, to generate an updated list of frame candidates; and
for each respective media item in the predetermined number of media items;
filtering the list of updated frame candidates based on a respective aspect ratio of the list of updated frame candidates being within a threshold cropping amount of the AR of the respective media item; and
matching the respective media to an updated frame candidate of the filtered list of updated frame candidates.

17. A system comprising:
at least one processor;
a display device; and
a storage device comprising instructions, which when executed by the at least one processor, cause the at least one processor to:
generate a list of frame candidates, the list of frame candidates including a plurality of different aspect ratios selected based on a width of the display device and an aspect ratio of one or more base tiles available to display media items on the display device;
receive a set of media items to display on the display device, each media item having a respective aspect ratio (AR);
for each respective media item in the set of media items:
filter the list of frame candidates to produce a filtered list of frame candidates by removing undesirable frames from the list of frame candidates in response to a determination that a respective aspect ratio of the undesirable frames in the list of frame candidates requires greater than a threshold cropping amount of the AR of the respective media item; and
match the respective media item to a particular frame candidate of the filtered list of frame candidates to produce a selected frame; and
display, on the display device, the set of media items in the selected frames.

18. The system of claim 17, wherein to generate the list of frame candidates, the at least one processor is configured to:
set a number of columns of the one or more base tiles for the display device; and
restrict a maximum size of each frame candidate in the list of frame candidates based on a multiple of the number of columns of the one or more base tiles, wherein the maximum size includes a maximum width and a maximum height.

19. The system of claim 17, wherein the instructions further cause the at least one processor to:
after each respective media item has been matched with a particular frame candidate, checking whether every frame candidate within a particular row has been matched with a respective media item of the set of media items.

20. The system of claim 19, wherein the at least one processor is further configured to: when it is determined that not all frame candidates within a row were matched:
reevaluate a predetermined number of media items for their respective frame candidates;
add additional frame candidates to the list of frame candidate, by splitting the size of the base tile, to generate an updated list of frame candidates; and
for each respective media item in the predetermined number of media items;
filter the list of updated frame candidates based on a respective aspect ratio of the list of updated frame candidates being within a threshold cropping amount of the AR of the respective media item; and match the respective media to an updated frame candidate of the filtered list of updated frame candidates.

\* \* \* \* \*